(12) United States Patent
Benton

(10) Patent No.: US 6,739,269 B1
(45) Date of Patent: May 25, 2004

(54) ADJUSTABLE TAILGATE TABLE

(76) Inventor: Micheal Wes Benton, 1082 Laurel Grove Ct., Suwanee, GA (US) 30024

( * ) Notice: Subject to any disclaimer, the term of this patent is extended or adjusted under 35 U.S.C. 154(b) by 0 days.

(21) Appl. No.: 10/241,439

(22) Filed: Sep. 12, 2002

(51) Int. Cl.[7] ............................................... A47B 23/00
(52) U.S. Cl. ........................................ 108/44; 108/152
(58) Field of Search ........................... 108/44, 45, 152; 296/26.08, 97.1, 44; 224/521, 519, 151, 8

(56) References Cited

U.S. PATENT DOCUMENTS

| | | | | |
|---|---|---|---|---|
| 2,471,730 A | * | 5/1949 | Doerr | 108/44 |
| 4,995,322 A | * | 2/1991 | Frederick | 108/44 |
| 5,040,467 A | * | 8/1991 | King | 108/42 |
| 5,232,133 A | | 8/1993 | Speer | |
| 5,730,066 A | | 3/1998 | Auten et al. | |
| 6,045,172 A | | 4/2000 | Thomas et al. | |
| 6,062,146 A | * | 5/2000 | Conners et al. | 108/44 |
| 6,082,269 A | | 7/2000 | Padberg | |
| 6,113,171 A | * | 9/2000 | Stearns | 296/26.08 |
| 6,125,772 A | * | 10/2000 | Clements | 108/129 |
| 6,189,458 B1 | * | 2/2001 | Rivera | 108/44 |
| 6,250,702 B1 | * | 6/2001 | Eipper | 296/26.1 |
| 6,314,891 B1 | * | 11/2001 | Larson | 108/44 |
| 6,336,413 B1 | * | 1/2002 | Ball | 108/44 |
| 6,467,417 B1 | * | 10/2002 | Guyot et al. | 108/44 |
| 2002/0008364 A1 | | 1/2002 | Kahlstorf | |

* cited by examiner

Primary Examiner—Jose V. Chen
(74) Attorney, Agent, or Firm—Dowell & Dowell PC

(57) ABSTRACT

A portable tailgate table having one end adapted to be supported by a receiver of a hitch assembly of an automotive vehicle and a second end supported by at least one leg and wherein an upper surface of the table is pivotably adjustable about two pivot axes to permit horizontal leveling of the table top regardless of an angle of inclination of a parked vehicle which supports the one of the table.

10 Claims, 3 Drawing Sheets

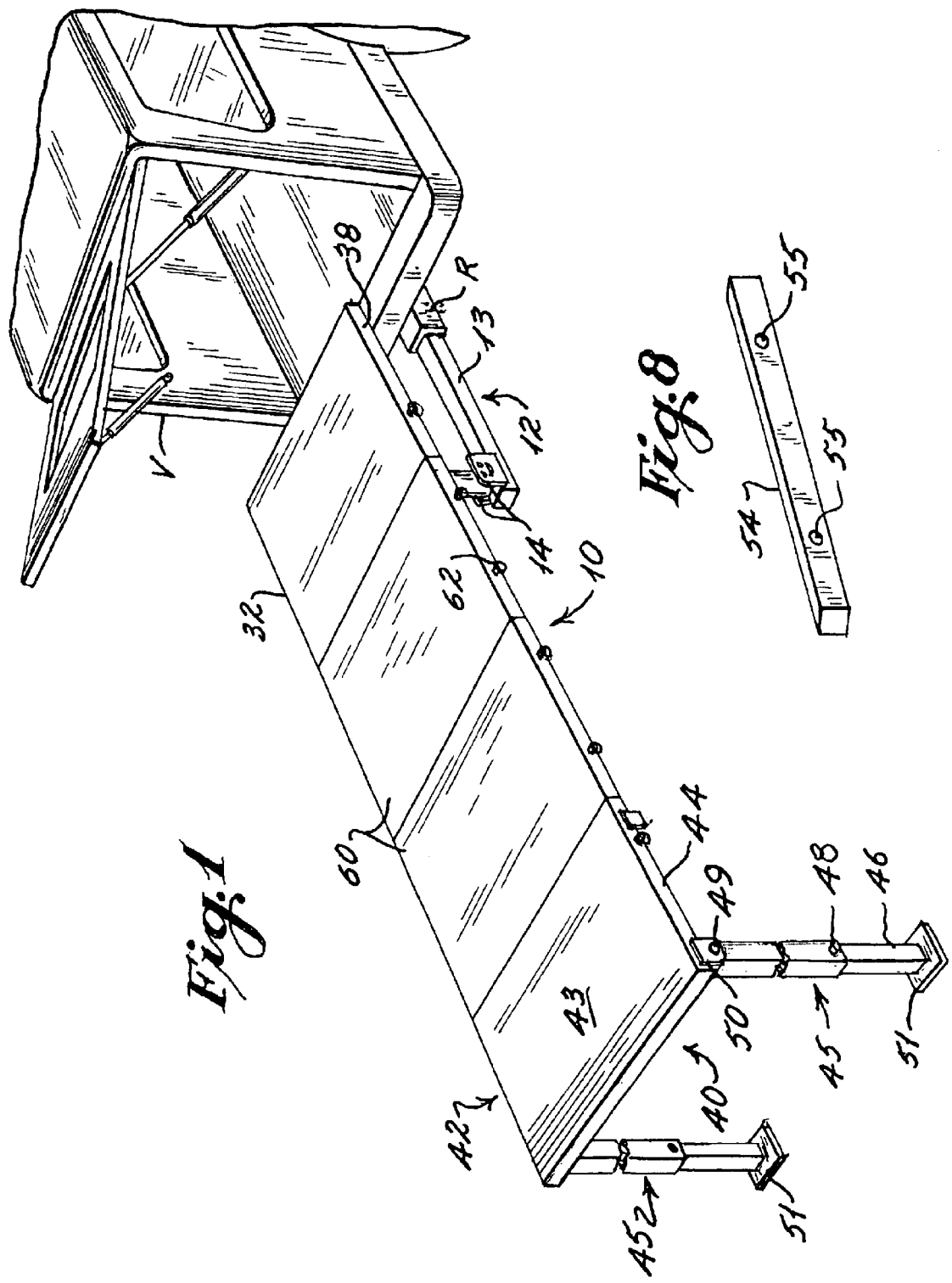

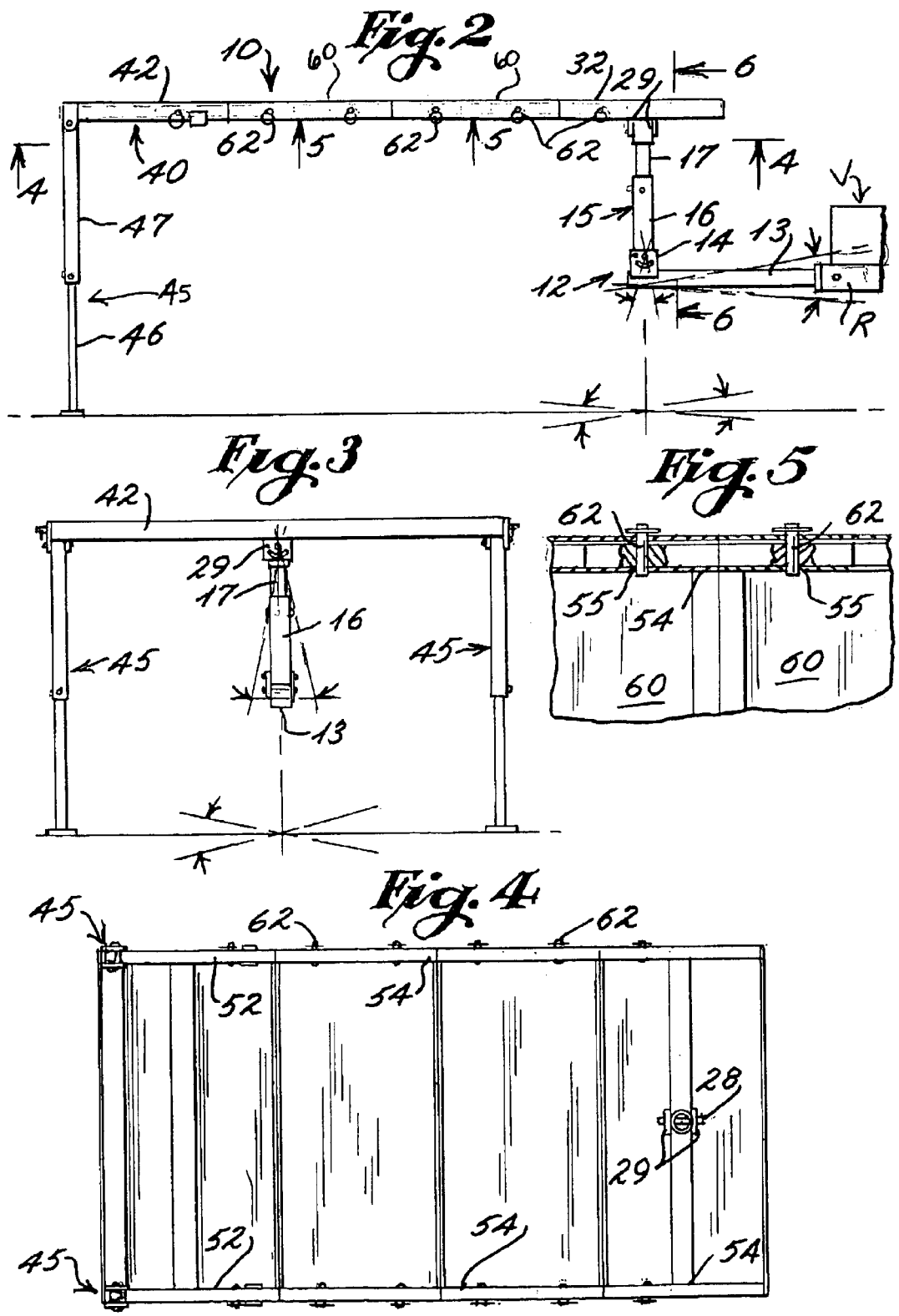

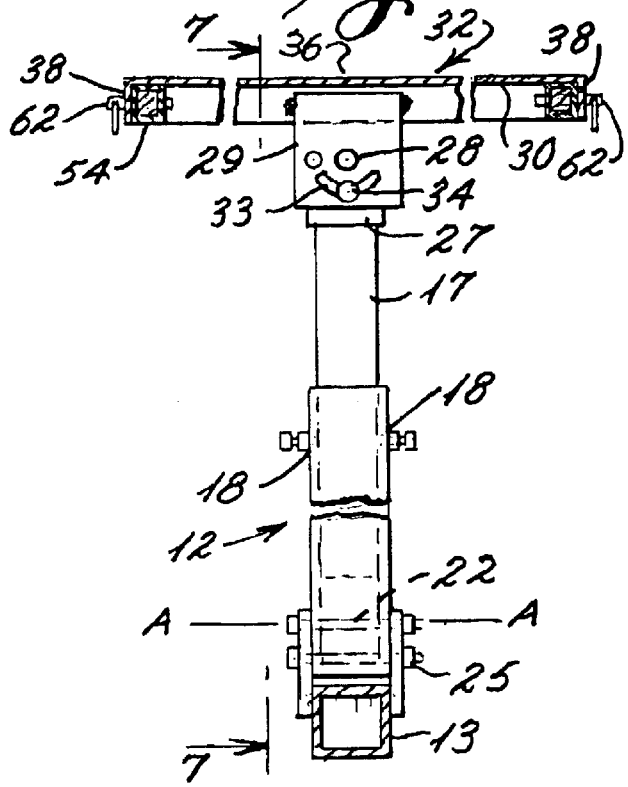
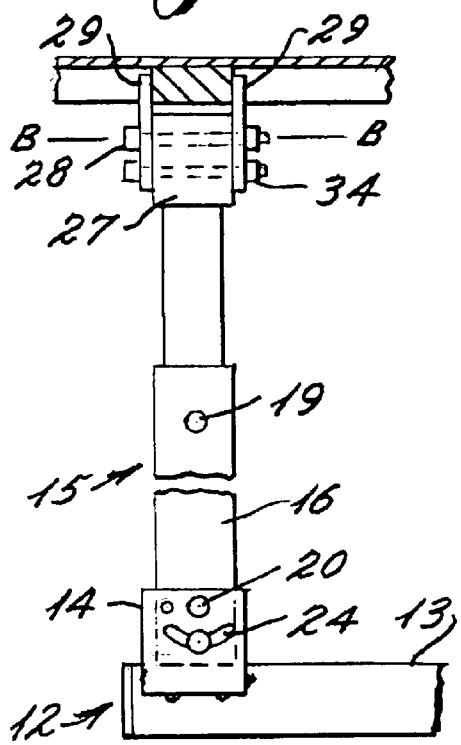
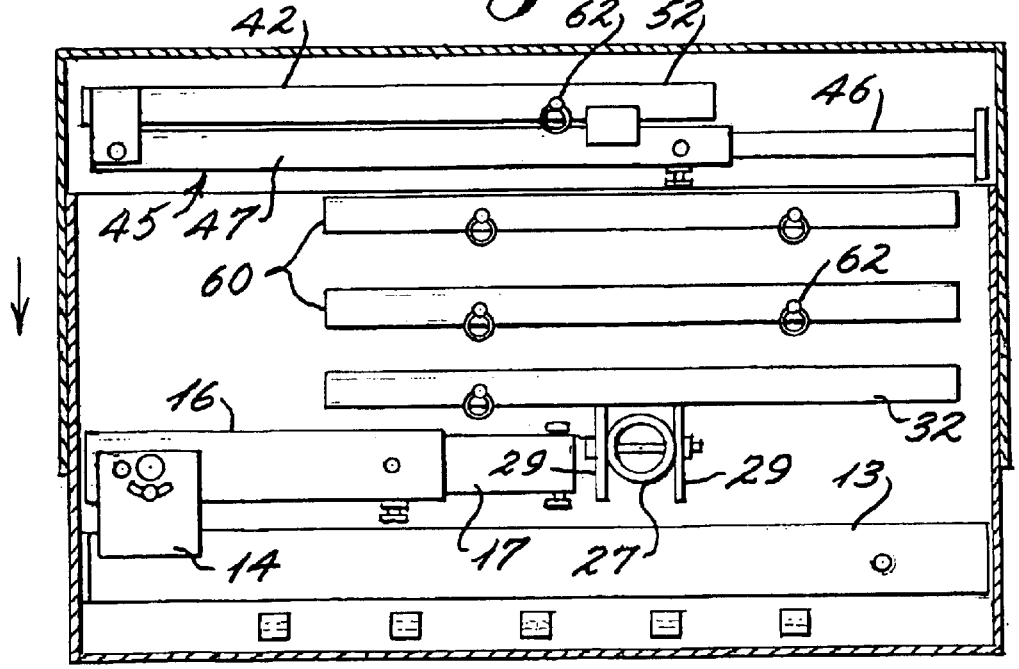

ADJUSTABLE TAILGATE TABLE

BACKGROUND OF THE INVENTION

1. Field of the Invention

This invention is generally directed to portable tables and more specifically to a portable and collapsible table which may be supported at one end by a receiver of a hitch assembly of an automotive vehicle. The invention is further directed to portable tables which are supported at one end by an automotive vehicle and which include a table top formed by one or more sections and which top is pivotable so as to permit leveling regardless of the positioning of the vehicle.

2. Brief Description of the Related Art

Tailgate gatherings have grown in popularity in the United States in recent years. Tailgate gatherings are normally conducted prior to major sporting or other entertainment events wherein people gather to enjoy food and refreshments prior to such events.

To facilitate the service of food and beverages, people often transport coolers, tables, chairs and the like to parking lots outside of a stadium or other facility in which the event is to take place. Due to limited space available in parking areas, it is necessary to maintain any tables or chairs in close proximity to parked vehicles. Therefore, in order to be practical, any table utilized not only must be easily portable and collapsible so that the table can be easily transported in an automotive vehicle, but the table must also be capable of being used in close proximity to a vehicle when in use.

A number of portable tables have been designed and patented specifically for use with automotive vehicles. Such tables not only can be used at tailgate gatherings but may be used for off road picnics, while camping and the like.

By way of example, in U.S. Pat. No. 2,471,730 to Doerr, a table attachment for a trunk of a vehicle is disclosed. The structure requires a separate storage compartment be mounted within the trunk of the vehicle which compartment serves as a support for one end of the table. Such a storage compartment in an automotive vehicle trunk is not practical in that it consumes a great deal of storage space in the vehicle. Further, the table disclosed, although having one or more vertically adjustable outer leg assemblies, can not be horizontally leveled as one end of the table is fixedly secured to the vehicle and will assume a pitch or angle of inclination determined by the angle of the vehicle when it is parked.

In U.S. Pat. No. 5,232,133 to Speer, a collapsible and portable table is disclosed for use with automotive vehicles which is specifically designed to be supported by a hitch ball associated with the hitch assembly of the vehicle. Such a portable table not only requires that the hitch ball of the vehicle be attached to its receiver, but also requires the use of stabilizing legs adjacent to the hitch ball in order to provide for stabilization of the table relative to the hitch. Many vehicle owners having vehicles with hitch receivers do not, have or utilize a hitchball.

In U.S. Pat. No. 5,730,066 to Auten et al., a portable table is disclosed which is designed to be supported at one end by being secured to a trunk lock receiver of an automotive vehicle. The table includes several sections and a pair of vertically adjustable outer legs. As with earlier portable tables designed for use with automotive vehicles, the surface of the table can not be leveled and will assume a pitch angle dependent upon an angle of the vehicle.

Other types of tables specifically designed for use with automotive vehicles are designed to be either completely or substantially supported by a receiver of a hitch assembly associated with such vehicles. Examples of these types of tables are disclosed in U.S. Pat. Nos. 6,082,269 to Padberg, 6,189,458 to Rivera, 6,314,891 to Larson and U.S. Published Application 2002/0008364 A1 to Kahlstorf. The tables disclosed in the patents to Padberg, Rivera and Kahlstorf are limited in size in that they are entirely supported by the receiver of the automotive vehicle. Therefore, such tables by necessity, are quite small. Further, the tables can not be adequately leveled horizontal due to the manner in which they are supported by the receivers of the automotive vehicles. The table disclosed in the patent to Larson also is somewhat compact but does provide for an additional ground support. Again, leveling of the table presents a problem when in use.

In view of the foregoing, there is a need to provide a collapsible and easily portable table which may be used with an automotive vehicle and which can be leveled regardless of the positioning of a parked vehicle to which one end of the table is supported.

SUMMARY OF THE INVENTION

This invention is directed to an easily assembled and dis-assembled portable table specifically designed to be used with automotive vehicles and which includes at least one table top section which is pivotably adjustable about two pivot axes relative to a support assembly which is supported within a receiver associated with a hitch assembly of an automotive vehicle. In a preferred embodiment, the table includes two support assemblies. A first support assembly includes a horizontal component of a size to be selectively received within the receiver of the hitch assembly of the automotive vehicle and an outer end portion to which is pivotally mounted a vertically adjustable support column or leg. The upper portion of the support column is pivotably attached to a bracket secured to a first table top section. The pivot axis of the attachment relative to the first table top section is oriented 90° with respect to the pivot attachment of the base portion of the column or leg with the horizontal support, such that the first table section may be leveled about two pivot axes which are oriented perpendicularly with respect to one another. In this manner, regardless of an angle or pitch of a vehicle, in either a forward to rear or side to side direction, the first table top section may be leveled horizontally. Appropriate securing fasteners are provided for securing the base of the column and the bracket secured to the first table top section in adjusted position.

The table of the present invention also includes an outer or second leg support assembly which includes a pair of spaced vertically adjustable support legs having ground engaging end portions and upper end portions which are pivotally adjustable relative to an outer table top section. The pivotal adjustment of the legs of the outer leg support assembly permits the legs to be folded beneath the outer table top section for compact storage.

In the preferred embodiment, one or more intermediate table top sections may be mounted intermediate the first table top section and the outer table top section. In order to support the intermediate table top sections, each of the sides of the first and outer table top sections include depending flanges to which connector tubes or bars having openings therein for receiving quick release pins may be secured. In a like manner, each of the intermediate table top sections includes opposing depending side flanges to which the connector bars may be secured. By use of the connector tubes or bars extending between the flanges of the table top sections and by locking the sections in place utilizing quick release pins, the overall table top may be securely and rigidly joined.

It is the primary object of the present invention to provide a portable table which is particularly structured and designed to be used with an automotive vehicle and which allows the surface of the table to be leveled regardless of the position of the vehicle which supports one end of the table.

It is a further object of the present invention to provide a table which can be used with automotive vehicles and which can either be very closely and compactly positioned relative to an automotive or can be extended by the addition of one or more extension leaves in order to provide for additional table top surface when desired.

It is yet another object of the present invention to provide a portable table which may be easily and compactly stored for transportation in an automotive vehicle and which can be easily assembled and supported from the automotive vehicle when in use.

BRIEF DESCRIPTION OF THE DRAWINGS

A better understanding of the invention will be had with reference to the attached drawings wherein:

FIG. 1 is a perspective illustrational view of a preferred embodiment of the present invention showing a plurality of table top sections assembled and being supported relative to a hitch receiver of an automotive vehicle;

FIG. 2 is a side elevational view of the table of FIG. 1 shown on a reduced scale;

FIG. 3 is a front view looking toward the vehicle receiver of the table shown in FIG. 1;

FIG. 4 is a bottom plan view taken along line 4—4 of FIG. 2;

FIG. 5 is an enlarged cross-sectional view showing the locking arrangement for securing an intermediate table top section to connector tubes or bars associated with the invention;

FIG. 6 is an enlarged view taken along line 6—6 of FIG. 2;

FIG. 7 is a view taken along line 7—7 of FIG. 6;

FIG. 8 is a perspective view of one of the connector tubes of the present invention; and FIG. 9 is a top plan view showing one manner in which components of the table may be compactly stored when disassembled.

DESCRIPTION OF THE PREFERRED EMBODIMENT

With continued reference to the drawing figures, the tailgate table 10 of the present invention is shown as being mounted to a receiver "R" of a hitch assembly associated with an automotive vehicle "V". The vehicle may be substantially any type of vehicle including a car, SUV, truck or the like. The table is designed to be compactly stored when not in use as will be described in greater detail hereinafter. The table is also designed to be supported, in part, by the automotive vehicle and, in part, by legs provided with the table.

With reference to FIG. 1, the table includes a first mounting assembly 12 which includes a horizontal tube 13 of a size to be cooperatively received within the receiver "R". Appropriate openings may be provided in the end of the tube 13 for receiving a locking pin used to lock the tube within the receiver "R".

A pair of mounting brackets 14 are provided along an outer portion of the tube 13.

With specific reference to FIGS. 6 and 7, pivotally mounted between the brackets 14 is a vertical support column or leg 15 having a tubular base member 16 in which is slidably and extendably received an upper member 17. The base member 16 has a pair of aligned openings 18 therein which selectively receive a locking pin or bolt 19. The pin or bolt 19 extends through pairs of aligned openings (not shown) formed in the upper member 17. Although a single pair of openings may be provided in the member 17, a plurality of vertically spaced pairs of openings may also be provided to allow vertical adjustment of the member 17 with respect to the base member 16.

The base member 16 is pivotably mounted about a pivot pin or bolt 20 which extends through aligned openings in the spaced brackets 14 and aligned pair of openings in the member 16.

In order to secure the leg 15 in a pivotally adjusted position relative to the tube 13, a locking bolt 22 extends through aligned openings in the base member 16 and outwardly through arcuate openings 24 in each of the brackets 14. The outer end of the bolts are secured by adjustable nuts 25 which may have associated lock washers therewith (not shown). The nuts are easily adjustable in order to lock the leg 15 relative to the tube 13. As opposed to utilizing a bolt and nut locking configuration, a bolt with an enlarged wing nut type locking member may also be used as well as other conventional fasteners.

By allowing the leg 15 to be vertically adjustable relative to the tube 13, regardless of the pitch of the vehicle in a forward to rear direction, such as if the vehicle is parked on a slope, the support leg 15 may be easily vertically adjustable in order to permit the table to be horizontally leveled when fully assembled.

The upper member 17 of the support leg 15 is mounted within a sleeve 27 which is pivotally mounted about a bolt 28 to a pair of spaced brackets 29 which are secured to an underside 30 of a first or inner table top section 32. Each of the brackets 29 also includes arcuate slots or openings 33 therein through which extend locking mechanisms 34 similar to that previously described for securing the base member 16 relative to the support tube 13. In this manner, the sleeve 27, and thus the inner table top section are pivotal relative to the leg 15. It should be noted that a pivot axis B—B of the upper table top section with the brackets 29 is at a 90° angle or perpendicular with respect to a pivot axis A—A of the base member 16 relative to the tube 13. In this manner, by adjusting the angle of the table top relative to the upper member 17 of the support leg 15, the table top section 32 may be leveled in a direction perpendicular to that of the vertical adjustment obtained by adjusting the angle of support of the base member 16 relative to the tube 13. Therefore, if the vehicle is parked at a pitch angle from side-to-side, the table 32 may be pivoted in order to level the table relative to the supporting structure afterwhich the locking mechanisms may be used to secure the table in adjusted position. The first table top section 32 is defined by a generally planar table top 36 and depending opposing sidewalls or flanges 38. The sidewalls may include a plurality of spaced openings therein for purposes to be described in greater detail hereinafter.

In the preferred embodiment, the table includes a second assembly 40 which includes an outer table top section 42 having an upper surface 43 and opposing sidewalls or flanges 44 having spaced openings therein.

The outer or second assembly 40 includes a pair of vertically adjustable legs 45 each having a lower tubular section 46 which is slidably and adjustably received within an upper tubular section 47. An appropriate spring loaded quick release locking pin 48 is insertable through aligned openings provided in the sections 46 and 47 in order to secure the sections in adjusted position. In this respect, either of the sections may have a plurality of spaced openings to permit vertical adjustment. The upper sections 47 are pivotably mounted at 49 to brackets 50 secured to the outer table section 42 by way of mounting tubes 52 having spaced openings therein. The tubes 52 are secured to the flanges or sidewalls 44 of the outer table top section 42 by using quick release locking pins 62 which are inserted through the openings in the tubes and sidewalls. An appropriate latching mechanism (not shown) may be associated with each bracket 49 in order to secure the legs 45 in a deployed position as shown in FIG. 1. Such a locking mechanism is preferably overcome by applying pressure to pivot the legs to a collapsed or stored position beneath the outer table top section 42 for appropriate storage.

It should be noted that although the legs 45 are disclosed, in the preferred embodiment, as being part of an outer assembly 40, in some embodiments, the legs may be pivotally secured to outer end corners of the inner table section 32 such that only a single table top section can be used in accordance with the teachings of the present invention. The size of the table top sections may vary keeping in mind that it is preferred that the sections be of a size which permit easy storage within the trunk of a vehicle or within the back storage compartment of an SUV or truck. Further, in order to provide stable support, it is preferred that each of the legs 45 includes an enlarged base member 51, as shown in the drawing figures.

One of the benefits of the table of the preferred embodiment of the present invention is that the table may be used in a compact deployment by simply securing the inner table section 32 to the outer table section 42. The connection of the table segments is accomplished by using connector tubes or bars 54, such as shown in FIG. 8. The connectors have a pair of spaced openings 55 therein for receiving spring-loaded quick-release locking pins 62 of a conventional type which include a detent type locking device. Each of the inner table top section 32 and the outer table top section 42 have pairs of aligned openings in the sidewalls thereof which align with the openings 55. When the connector is aligned with the openings, the locking pins are inserted in order to lock the connector to the sidewalls of the table top sections thereby securing the sections in assembled relationship. As opposed to utilizing connector tubes or bars, the table top sections could be telescopically assembled with respect to one another, however, this could increase the cost of the overall table.

The table of the present invention may also be extended by providing one or more intermediate table top sections 60. Each section is identically constructed so that they may be used interchangeably in any order. In the preferred embodiment shown in FIG. 1, each of the intermediate table top sections 60 includes two pair of aligned openings 61 in sidewalls or flanges 62 thereof which are spaced relative to one another. A first pair of openings are used to secure one of the connectors 54 between either the inner table section 32 or outer table section 42 and the opposite set of aligned openings are used to cooperate with the openings 55 in an intermediate connector 54 extending between those openings. The connectors are locked in place as previously described using spring-loaded quick-release locking pins. Again, other locking arrangements or extension arrangements may be used in keeping with the teachings of the invention. The manner in which the locking pins 62 cooperate to engage the connectors 54 with the two intermediate table top sections 60 is shown in FIG. 5.

When not in use, the components of the table of the present invention are designed to be compactly stored. One illustration of a compact storage arrangement is shown in FIG. 9. As shown, the support tube 13 and vertical support leg 15 are pivoted into a closed compact relationship for storage. Further, the legs 45 are fully collapsed such that the lower leg sections are fitted within the upper leg sections and the legs are pivoted beneath the outer table top section. The table top sections may also formed such that they may be stacked relative to one another into a compact relationship to facilitate portability.

In use, the support tube 13 is inserted within the receiver "R" of a supporting vehicle. Thereafter, the support leg 15 is pivoted and vertically aligned to compensate for any angle of inclination of a vehicle in a forward to reverse direction. Thereafter, the leg 15 is locked into position as previously described. The inner table top section 32 is then mounted by way of the bracket assembly 29 and sleeve 28 to the upper portion of the member 17 of the support leg and thereafter pivotally aligned to compensate for any angular pitch of the vehicle in a side-to-side direction.

After the first or inner table top section is appropriately aligned, either the outer table top section or one or more intermediate table top sections may be assembled or connected to the inner table section as previously described utilizing the spring-loaded quick-release locking pins. Thereafter, the table legs mounted by the tubes 52 to the outer table top section 42 and are pivoted out to a use position and extended as necessary to make appropriate contact with a support surface. The legs are subsequently locked into place again utilizing quick release mechanisms.

The present invention as described permits a table to be either used in a very compact configuration relative to a supporting vehicle or extended using a plurality of sections or leaves to increase the table size or seating capacity. The invention thus provides utility in not only allowing the table surface to be leveled about two pivot axes but also allows the table to be used in different configurations.

The foregoing description of the preferred embodiment of the invention has been presented to illustrate the principles of the invention and not to limit the invention to the particular embodiment illustrated. It is intended that the scope of the invention be defined by all of the embodiments encompassed within the following claims and their equivalents.

I claim:

1. A table for use with an automotive vehicle having a hitch receiver, the table including, a first assembly including a support tube of a size to be slidingly received within the receiver, a vertical support leg pivotally mounted to said support tube, means for adjustably securing said vertical support leg in a first adjusted position relative to a first pivot axis relative to said support tube, a first table top section, first means for pivotally mounting said first table top section to said vertical support leg such that said first table top section is pivotal about a second pivot axis which second pivot axis is generally perpendicular to said first pivot axis, and means for securing said first table top section relative to said support leg.

2. The table of claim 1 including a second assembly including an outer table top section, at least one leg pivotally connected to said outer table top section, said at least one leg being vertically adjustable, and means for connecting said first table top section to said outer table top section.

3. The table of claim 2 including a pair of legs pivotally connected to said outer table top section.

4. The table of claim 2 in which said means securing said first table top section to said outer table top section includes a pair of connector bars, and means for locking said connector bars to each of said first table top section and said outer table top section.

5. The table of claim 1 in which said vertical support leg includes a lower member and an upper member and means for adjustably securing said upper member relative to said lower member.

6. The table of claim 5 in which said means for adjustably securing said vertical support leg includes a pair of bracket members connected to said support tube, said lower member of said support leg being pivotally mounted to said bracket members, and means extending through said bracket members for securing said vertical support leg in adjusted position relative to said bracket members.

7. The table of claim 6 in which said means for pivotally mounting said first table top section includes a pair of second bracket members extending from a lower surface of said first table top section, and pivot connection means connecting said upper member of said vertical support leg to said second bracket members.

8. The table of claim 7 including at least one intermediate table top section, and means for securing said at least one intermediate table top section between said first table top section and said outer table top section.

9. The table of claim 1 including at least one intermediate table top section, and means for securing said at least one intermediate table top section between said first table top section and said outer table top section.

10. The table of claim 9 in which said means securing said at least one intermediate table top section between said first table top section to said outer table top section includes at least one pair of connector bars, and means for locking said connector bars to said first table top section, said at least one intermediate table top section and said outer table top section.

* * * * *